(12) United States Patent
Wang

(10) Patent No.: US 8,529,655 B2
(45) Date of Patent: Sep. 10, 2013

(54) DUST COLLECTOR STRUCTURE

(76) Inventor: Chun-Hsiang Wang, Taichung (TW)

( * ) Notice: Subject to any disclaimer, the term of this patent is extended or adjusted under 35 U.S.C. 154(b) by 145 days.

(21) Appl. No.: 13/097,056

(22) Filed: Apr. 29, 2011

(65) Prior Publication Data

US 2012/0096820 A1    Apr. 26, 2012

(30) Foreign Application Priority Data

Oct. 25, 2010   (TW) ............................... 99220592 U

(51) Int. Cl.
*B01D 46/00* (2006.01)

(52) U.S. Cl.
USPC .................... 55/356; 55/361; 55/366; 55/368; 55/428; 55/429; 55/467; 248/677

(58) Field of Classification Search
USPC .................... 55/356, 358, 361, 366, 373, 374, 55/378, 428, 429, 467; 248/637, 646, 674, 248/677, 678
See application file for complete search history.

(56) References Cited

U.S. PATENT DOCUMENTS

| | | | |
|---|---|---|---|
| 5,163,985 A * | 11/1992 | Chen | 55/356 |
| 5,169,420 A * | 12/1992 | Chen | 55/315 |
| 5,516,349 A * | 5/1996 | Bouthillier | 96/381 |
| 6,507,974 B1 * | 1/2003 | Cheng | 15/347 |
| 6,875,148 B2 * | 4/2005 | Patzer et al. | 475/230 |
| 7,217,307 B2 * | 5/2007 | Cheng | 55/356 |
| 2011/0167586 A1 * | 7/2011 | Szommer et al. | 15/347 |

* cited by examiner

*Primary Examiner* — Duane Smith
*Assistant Examiner* — Sonji Turner
(74) *Attorney, Agent, or Firm* — Leong C. Lei

(57) ABSTRACT

The present invention provides a dust collector structure, especially a low-cost and simplified dust collector structure, which includes a leg frame set, an air-guiding box and a driving unit. The leg frame set includes two inverted U-shaped frame rods which are integrally formed and correspond to each other. The air-guiding box is arranged across top ends of the two frame rods, and is made by correspondingly closing an upper cover and a lower cover which are formed through integral draw molding. A driving unit for driving a blowing fan is arranged at an end of the air-guiding box. An air-filtering bag and a dust-collecting bag corresponding to each other are arranged at an end opposite to the driving unit on the upper and lower covers of the air-guiding box. Thus, structural components can be greatly simplified. Moreover, compared with a conventional locking or welding manner, since the upper and lower covers of the air-guiding box are integrally formed through a draw molding technique, the production yield and efficiency can be further improved, and the volume can be further reduced after the dust collector structure is folded away, so as to save space for transporting and storing.

1 Claim, 4 Drawing Sheets

DUST COLLECTOR STRUCTURE

BACKGROUND OF THE INVENTION (a) Technical Field of the Invention

The present invention relates to an industrial dust collecting field. More particularly, the present invention relates to a dust collector structure, which occupies little space and has a simplified mechanism, thereby improving the production yield and efficiency and further improving the economic benefit.

(b) Description of the Prior Art

Generally, a machining environment with much dust, such as a timber mill or a powder processing factory, is provided with a dust collector for collecting and filtering dust in the air, so as to maintain the air quality in a factory. The dust collector is generally provided with an air-guiding box mounted on a movable trolley. The air-guiding box has an upper air outlet and a lower dust-falling opening corresponding to each other at one end thereof, and an air inlet is formed at the other end in the air-guiding box. A blowing fan driven at a high speed by a driving unit is arranged in the air-guiding box corresponding to the air inlet. An air-filtering bag extending upwards is sleeved on the air outlet of the air-guiding box, and a dust-collecting bag extending downwards is sleeved on the dust-falling opening of the air-guiding box. Thus, outside dust-containing air is sucked in by rotating the blowing fan at a high speed through the driving unit. After removing the remaining dust contained in the outside air by filtering through the air-filtering bag, the air is discharged to the outside through the air-filtering bag and the dust falls into the dust-collecting bag below, thereby achieving an effect of separating the dust from the air and achieving an aim of collecting the dust.

There are two manners used for assembling and fixing the above-mentioned conventional dust collector. One manner is mainly to arrange a supporting rod between the trolley and four corners of the air-guiding box, and the other manner is to use a fixed column to support the driving unit and then mount the air-guiding box through the driving unit. In either of the above manners, the dust collector has many components and locking parts, thus increasing the difficulty of manufacturing and assembling thereof. Due to uneasy demounting, the dust collector should be accommodated in its original form when transported or stored, thus causing problems of big volume and large occupied space and unavoidably increasing the cost of transporting and storing.

Furthermore, the air-guiding box is made by correspondingly closing an upper cover and a lower cover. At present, the upper cover and the lower cover are mainly assembled by mounting a ring-shaped external frame panel, an upper panel (or a lower panel), an air outlet ring frame (a dust-falling opening ring frame) and the like in a locking, riveting or welding manner. The air-guiding box not only has many components, but also has many processing steps, and meanwhile it easily causes an increased rejection rate and affects the production efficiency, thus increasing the cost of manufacturing and assembling.

In other words, the existing dust collector has problems of big volume and large occupied space, and meanwhile it has a high rejection rate and low efficiency during manufacturing, thus increasing its overall cost. Therefore, the existing dust collector cannot satisfy demands for practical use, and it needs to be further improved.

SUMMARY OF THE INVENTION

Accordingly, the present invention is mainly directed to providing a dust collector structure occupying little space. In this way, components can be effectively simplified and an overall volume thereof is reduced, thereby decreasing the cost of transporting and storing.

Furthermore, the present invention is also directed to providing a low-cost dust collector structure, which can decrease the rejection rate for manufacturing and increase the production efficiency, thereby improving the economic benefit.

By implementing the technical aspects of the present invention, the components of the dust collector structure of the present invention can be greatly simplified, and meanwhile, since the upper cover and the lower cover of the air-guiding box is integrally formed through a draw molding technique, the production yield and efficiency can be increased. In addition, after the structure is folded away, its volume can be further reduced, thereby achieving an aim of reducing space for transporting and storing. Thus, its additional value can be greatly improved and its economic benefit can be increased.

DETAILED DESCRIPTION OF THE PREFERRED EMBODIMENTS

Figure 1:
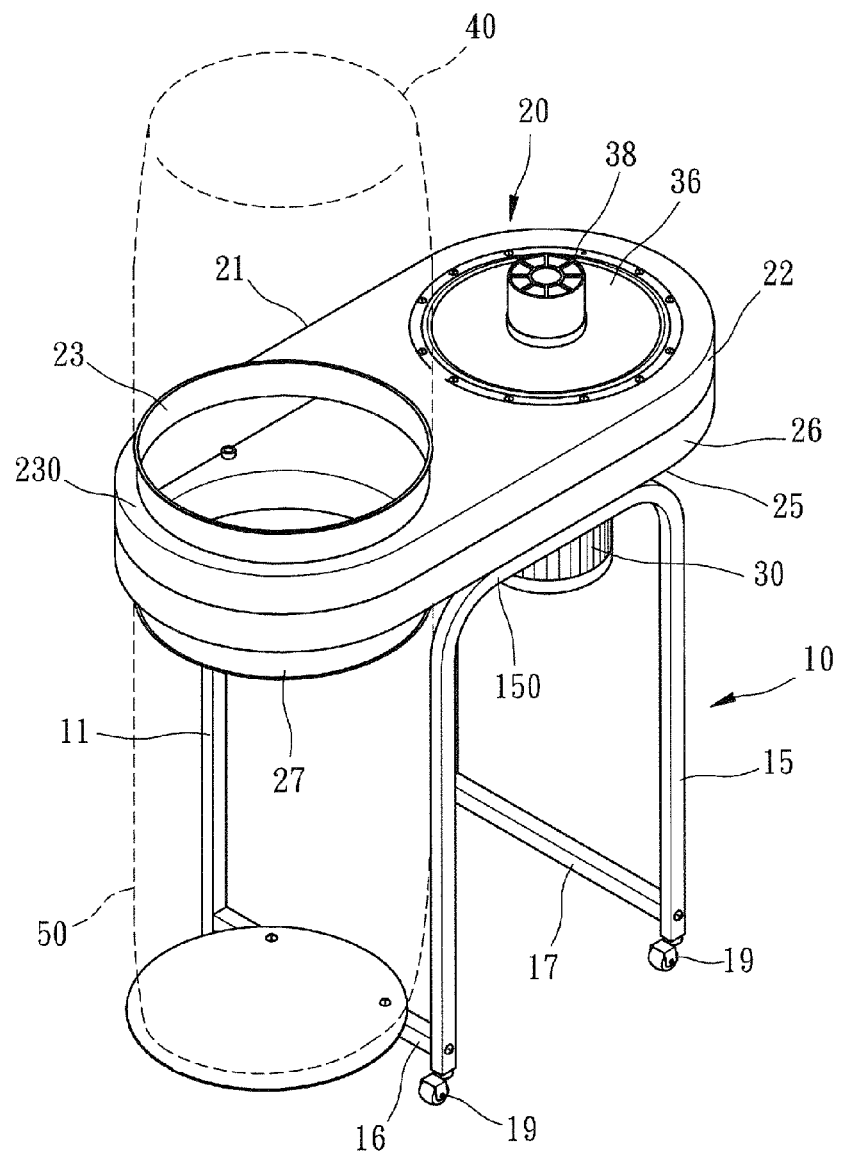
FIG. 1 is a schematic perspective appearance view of the dust collector structure of the present invention.
Figure 2:
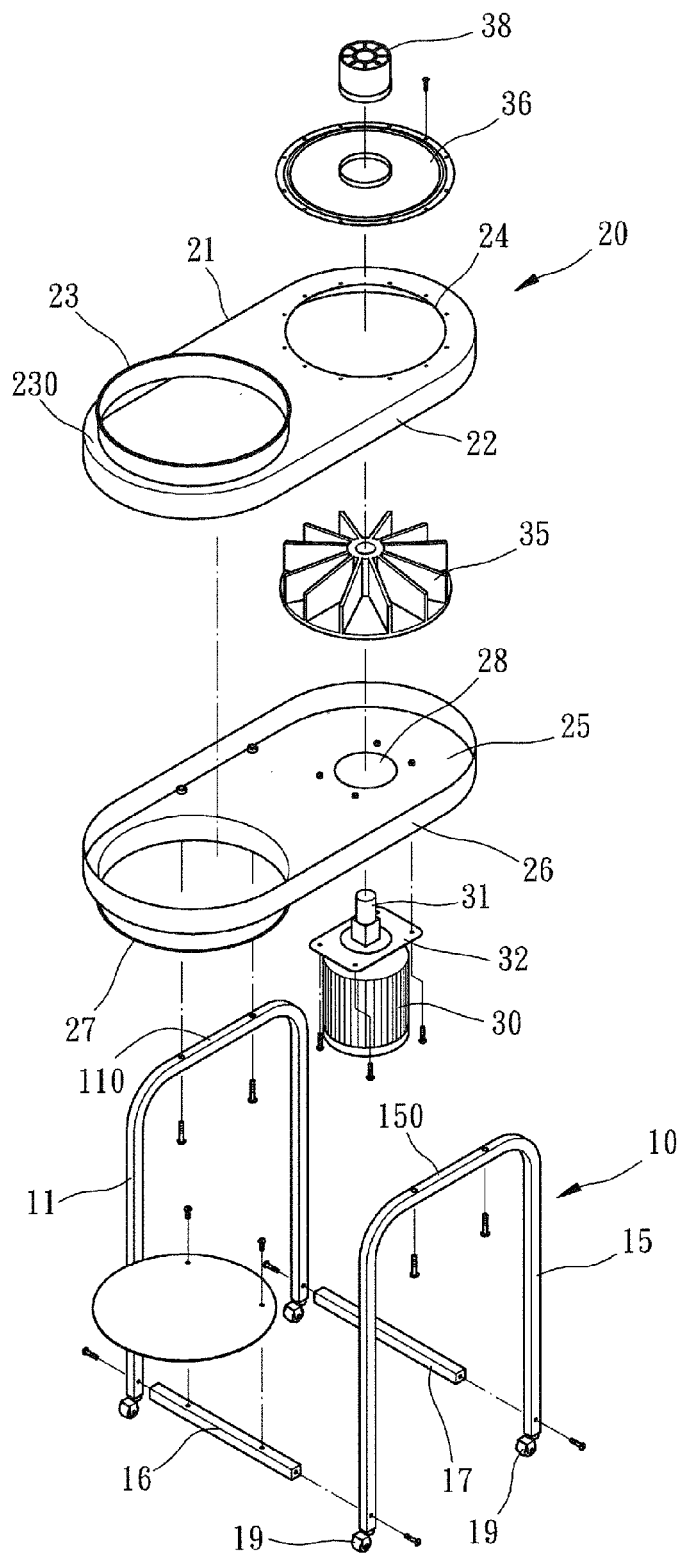
FIG. 2 is an exploded perspective view of the dust collector structure of the present invention, for illustrating a composition of its main elements and their relationships.

The present invention provides a dust collector structure with simplified components. As shown in FIGS. 1 and 2, the dust collector structure includes a leg frame set 10, an air-guiding box 20 and a driving unit 30. The air-guiding box 20 is provided with an upper air-filtering bag 40 and a lower dust-collecting bag 50 corresponding to each other at an end thereof. Since the above-mentioned air-filtering bag 40 and dust-collecting bag 50 have the same composition and operation principle as the existing ones, and are not features of the present invention. Thus, they will not be described any further.

Figure 3:
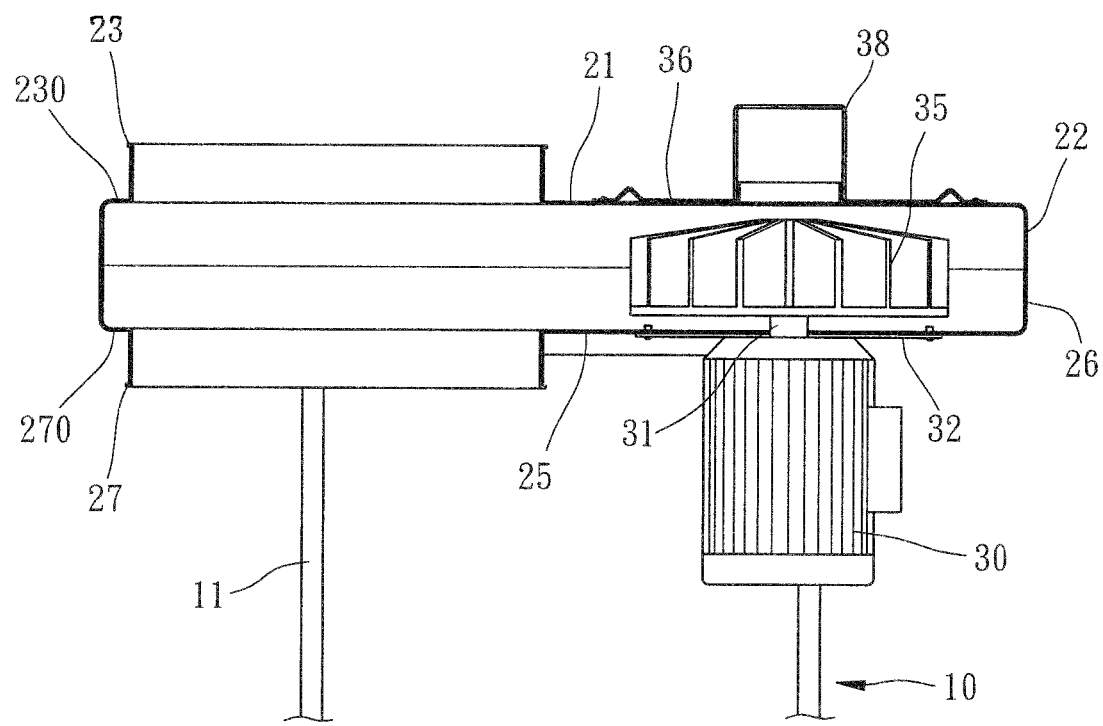
FIG. 3 is an internal composition view of an air-guiding box of the dust collector structure of the present invention.
Figure 4:
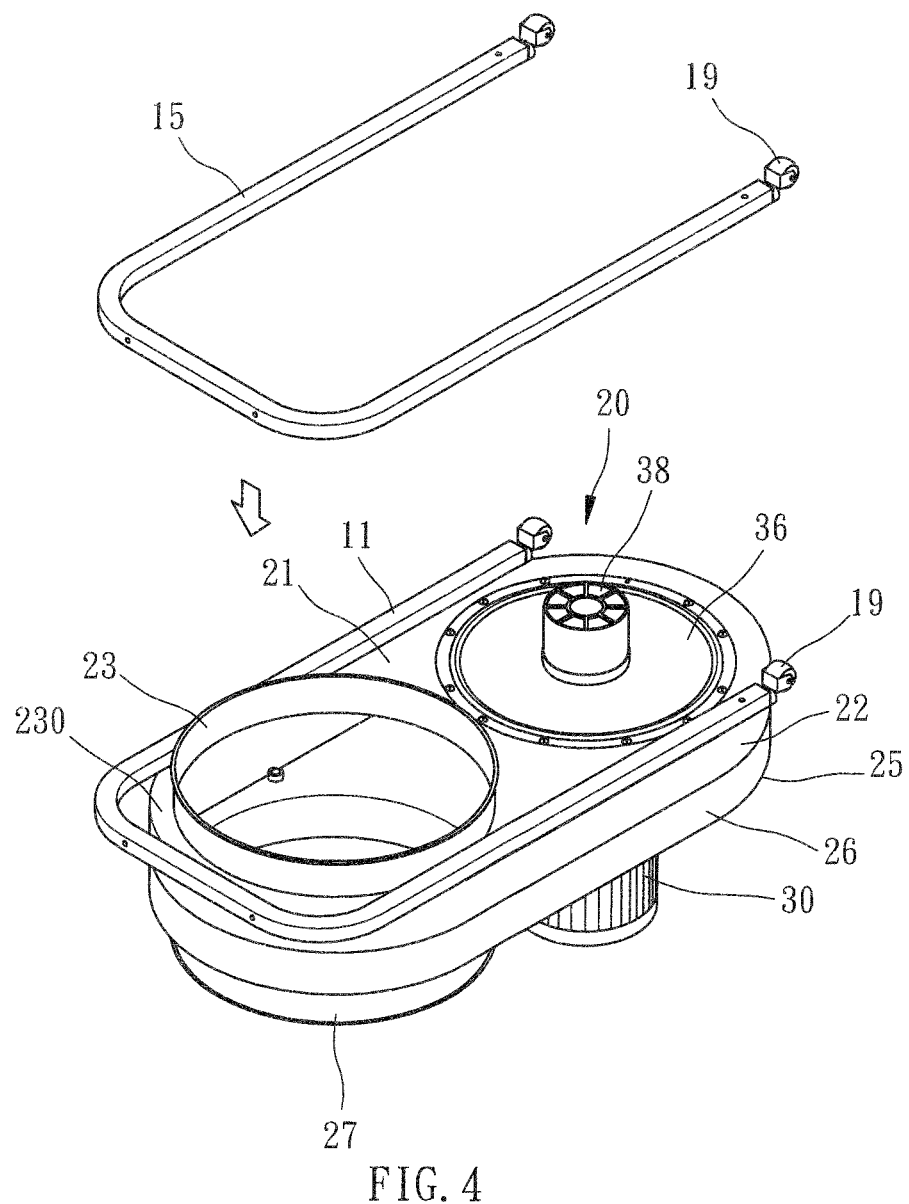
FIG. 4 is a schematic appearance view of the dust collector structure of the present invention when folded away in practical use.

Refer to FIGS. 1, 2 and 3 for a detailed composition of the structure of the present invention. As shown in these figures, the leg frame set 10 includes a first frame rod 11 and a second frame rod 15 which are both inverted U-shaped. The first and second frame rods 11 and 15 are provided with corresponding top rods 110 and 150 at top ends thereof. Supporting rods 16 and 17 are respectively locked at bottom ends of two side rods of the first and second frame rods 11 and 15, so that the leg frame set 10 can produce a surrounding support effect by using the supporting rods 16 and 17 and the side rods of the first and second frame rods 11 and 15, thereby improving the stability of the leg frame set 10. Meanwhile, the bottom ends of the two side rods of the first and second frame rods 11 and 15 are respectively provided with a roller wheel, so as to move the dust collector easily.

The air-guiding box 20 is arranged across the top rods 110 and 150 of the first and second frame rods 11 and 15 of the leg frame set 10. The air-guiding box 20 is made by correspondingly closing an upper cover 21 and a lower cover 25. The upper cover 21 and the lower cover 25 are integrally formed through a draw molding technique. Edges of the upper and lower covers 21 and 25 have side panel portions 22 and 26 which are bent and can be joined correspondingly. The upper cover 21 has an air outlet ring-joint portion 23 protruding outwards on a top portion of one end thereof. The air outlet ring-joint portion 23 is used for the air-filtering bag 40 to sleeve, and a necked-down near-edge portion 230 is formed between a top face of the upper cover 21 and an external side wall of the air outlet ring-joint portion 23. The air outlet ring-joint portion 23 has an outer diameter slightly smaller than a width between the two side rods of the above-mentioned first and second frame rods 11 and 15, so that the first and second frame rods 11 and 15 can be arranged across. Moreover, the upper cover 21 has an air inlet 24 which is a through hole at an end thereof opposite to the air outlet ring-joint portion 23. A dust-falling opening ring-joint portion 27 corresponding to the air outlet ring-joint portion 23 and protruding outwards is formed on a bottom portion of the lower cover 25. The dust-falling opening ring-joint portion 27 is used for the dust-collecting bag 50 to sleeve, and a necked-down near-edge portion 270 is formed between a bottom face of the lower cover 25 and an external side wall of the dust-falling opening ring-joint portion 27. The dust-falling opening ring-joint portion 27 has an outer diameter slightly smaller than a width between the two side rods of the above-mentioned first and second frame rods 11 and 15, so that the first and second frame rods 11 and 15 can be arranged across. Furthermore, the lower cover 25 is provided with a through hole 28 corresponding to the air inlet 24, for mounting the driving unit 30.

The driving unit 30 has an output shaft 31 which can penetrate into the air-guiding box 20. A top end of a shell of the driving unit 30 is correspondingly locked to the through hole 28 of the lower cover 25 of the air-guiding box 20 through a fixing plate 32. Moreover, the output shaft 31 is provided with a blowing fan 35 in the air-guiding box 20. The driving unit 30 is locked to and covered with a cover plate 36 at the air inlet 24 of the upper cover 21 of the air-guiding box 20, and the cover plate 36 has a blowing pipe 38 which can introduce air from the outside and is used for an air-collecting pipe (not shown) to connect with.

In this way, a dust collector structure with simplified components and low cost is made.

Refer to FIGS. 1 and 3 for the practical use of the present invention. As shown in these figures, the blowing fan 35 can be rotated at a high speed by using the driving unit 30, so as to suck in outside dust-containing air from the blowing pipe 38 of the air-guiding box 20. The air then flows into the air-filtering bag 40 through the air outlet ring-joint portion 23 of the upper cover 21, so as to remove the remaining dust contained in the outside air by filtering, discharge the air to the outside through the air-filtering bag 40 and make the heavier dust fall into the dust-collecting bag 50 below through the dust-falling opening ring-joint portion 27 of the lower cover 25 of the air-guiding box 20, thereby achieving an effect of separating the dust from the air and an aim of collecting the dust.

Through the above structure design, in the dust collector structure of the present invention, the upper and lower covers 21 and 25 of the air-guiding box 20 is made through a draw molding technique, with no need for a conventional screwing, riveting or welding manner, thereby not only greatly increasing the manufacturing and assembling speed, but also decreasing the manufacturing rejection rate. Thus, the production cost is naturally decreased. Furthermore, since only the leg frame set 10 and the air-guiding box 20 of the dust collector should be mounted and fixed, the structure is greatly simplified. Also, the leg frame set 10 is simply made by locking the first and second frame rods 11 and 15, so it can be demounted easily when a user transports or stores the structure. Moreover, since the first and second frame rods 11 and 15 are arranged across the air outlet ring-joint portion 23 or the dust-falling opening ring-joint portion 27 of the air-guiding box 20, the volume of the structure can be greatly reduced for storage and the structure occupies little space, thereby achieving an aim of decreasing the cost of transporting and storing. Therefore, an additional value of the structure can be greatly improved and its economic benefit can be increased.

I claim:

1. A dust collector structure, comprising a leg frame set, an air-guiding box and a driving unit, wherein:

the leg frame set comprises a first frame rod and a second frame rod which are both inverted U-shaped, and the first and second frame rods each have two side rods having top ends to and between which a corresponding top rod is mounted so that the two side rods are spaced from each other by a predetermined distance, each of the top rods of the first and second frame rods being independently mounted to the air-guiding box in a releasable manner with the top rods being set in a length direction of the air-guiding box, each of the side rods having a bottom end to which a roller wheel is directly mounted, supporting rods being mounted between the first and second frame rods and have ends respectively fixed to the side rods of the first and second frame rods of the leg frame set;

the air-guiding box is arranged across the top rods of the first and second frame rods, and the air-guiding box is made by correspondingly closing an upper cover and a lower cover which are integrally formed, wherein edges of the upper and lower covers have side panel portions which are bent and joined correspondingly, the upper cover has an air outlet ring-joint portion protruding outwards on a top portion of an end thereof, the upper cover also has an air inlet which is a through hole at an end thereof opposite to the air outlet ring joint portion in the length direction, and a dust-falling opening ring joint portion corresponding to the air outlet ring-joint portion and protruding outwards is formed on a bottom portion of the lower cover, the air outlet ring joint portion having an outer diameter that is smaller than the predetermined distance between the side rods of each of the first and second frame rods, the outer diameter of the air outlet ring-joint portion being smaller than a dimension of the air-guiding box in a width direction substantially perpendicular to the length direction so as to form a necked-down near edge portion on which the first and second frame rods, when released from the air-guiding box, are positionable with the side rods on opposite sides of the air outlet ring joint portion and extending in the length direction;

the driving unit has an output shaft which penetrates into the air-guiding box, the driving unit is locked at the bottom of the lower cover corresponding to the air inlet of the air-guiding box, the output shaft is provided with a blowing fan in the air-guiding box, and the driving unit is locked with a blowing pipe for introducing air from the outside at the air inlet of the upper cover of the air-guiding box, the driving unit having a fixing plate at a top end thereof, so as to lock the driving unit on a bottom face of the lower cover of the air-guiding box, the driving unit being covered with a cover plate at the air inlet of the upper cover of the air-guiding box, and the blowing pipe being arranged on the cover plate;

in this way, the air outlet ring-joint portion of the air-guiding box is used for sleeving an air-filtering bag, and the dust-falling opening ring-joint portion of the air-guiding box is sleeved with a corresponding dust-collecting bag, so as to form a simplified and low-cost dust collector structure.

* * * * *